(12) United States Patent
Shikuwa et al.

(10) Patent No.: US 7,365,290 B2
(45) Date of Patent: Apr. 29, 2008

(54) METHOD AND DEVICE FOR THIN PLATE ARTICLE INDUCTION HEATING, AND THIN PLATE ARTICLE

(75) Inventors: Shingo Shikuwa, Kawasaki (JP); Yosiyuki Morisita, Kawasaki (JP); Hisao Hoshino, Hamura (JP); Tatsushi Yurudume, Hamura (JP); Satoshi Shimizu, Hamura (JP)

(73) Assignee: Kikuchi Co., Ltd., Tokyo (JP)

( * ) Notice: Subject to any disclaimer, the term of this patent is extended or adjusted under 35 U.S.C. 154(b) by 0 days.

(21) Appl. No.: 10/524,868

(22) PCT Filed: Jun. 25, 2004

(86) PCT No.: PCT/JP2004/008987

§ 371 (c)(1),
(2), (4) Date: Feb. 14, 2005

(87) PCT Pub. No.: WO2005/002282

PCT Pub. Date: Jan. 6, 2005

(65) Prior Publication Data

US 2005/0274718 A1    Dec. 15, 2005

(30) Foreign Application Priority Data

Jun. 30, 2003   (JP) .............................. 2003-186325

(51) Int. Cl.
*H05B 6/10* (2006.01)
*H05B 6/06* (2006.01)

(52) U.S. Cl. ...................................... 219/645; 219/665

(58) Field of Classification Search ................ 219/645, 219/634, 627, 655, 643, 665, 663, 667, 656, 219/662; 148/108, 111, 565, 567, 579, 568; 266/103, 138, 252
See application file for complete search history.

(56) References Cited

U.S. PATENT DOCUMENTS

| 3,781,506 | A | * | 12/1973 | Ketchum et al. ........... 219/627 |
| 4,222,799 | A | * | 9/1980 | Hijikata et al. ............. 148/568 |
| 6,180,933 | B1 | * | 1/2001 | Demidovitch et al. ...... 219/655 |
| 2004/0169321 | A1 | | 9/2004 | Tanaka et al. |

FOREIGN PATENT DOCUMENTS

EP    0 839 588    5/1998

(Continued)

*Primary Examiner*—Quang Van
(74) *Attorney, Agent, or Firm*—Flynn, Thiel, Boutell & Tanis, P.C.

(57) ABSTRACT

A reduction of the unevenness of a temperature increase at the end of heating work can be achieved without specific equipment, and with securing the shortening of the working time, which is an advantage of a bulk heating.

When a region to be heated of an article made of a thin sheet is heated inductively so that the whole region thereof reaches a temperature equal to or more than a target temperature using an inductive portion of a heating inductor, to which a high-frequency current is applied by a power supply device, by stopping or reducing temporarily the power application of the high-frequency current to the heating inductor during the temperature increase, a temperature difference in the region to be heated is reduced so that the unevenness of the temperature increase at the end of the heating work is reduced by the step of reducing the temperature difference.

6 Claims, 13 Drawing Sheets

FOREIGN PATENT DOCUMENTS

| | | |
|---|---|---|
| FR | 2 307 432 | 11/1976 |
| GB | 608 707 | 9/1948 |
| JP | 63-279592 | 11/1988 |
| JP | 06-295782 | 10/1994 |
| JP | 06295782 A * | 10/1994 |
| JP | 09-257752 | 10/1997 |
| JP | 09257752 A * | 10/1997 |
| JP | 10-017933 | 1/1998 |
| JP | 2000-256733 | 9/2000 |
| JP | 2003-013133 | 1/2003 |
| JP | 2003-160062 | 6/2003 |
| JP | 2003-239018 | 8/2003 |
| JP | 2003-301218 | 10/2003 |
| WO | WO 02/079525 | 10/2002 |
| WO | WO 03/046230 | 6/2003 |

* cited by examiner

F I G. 2
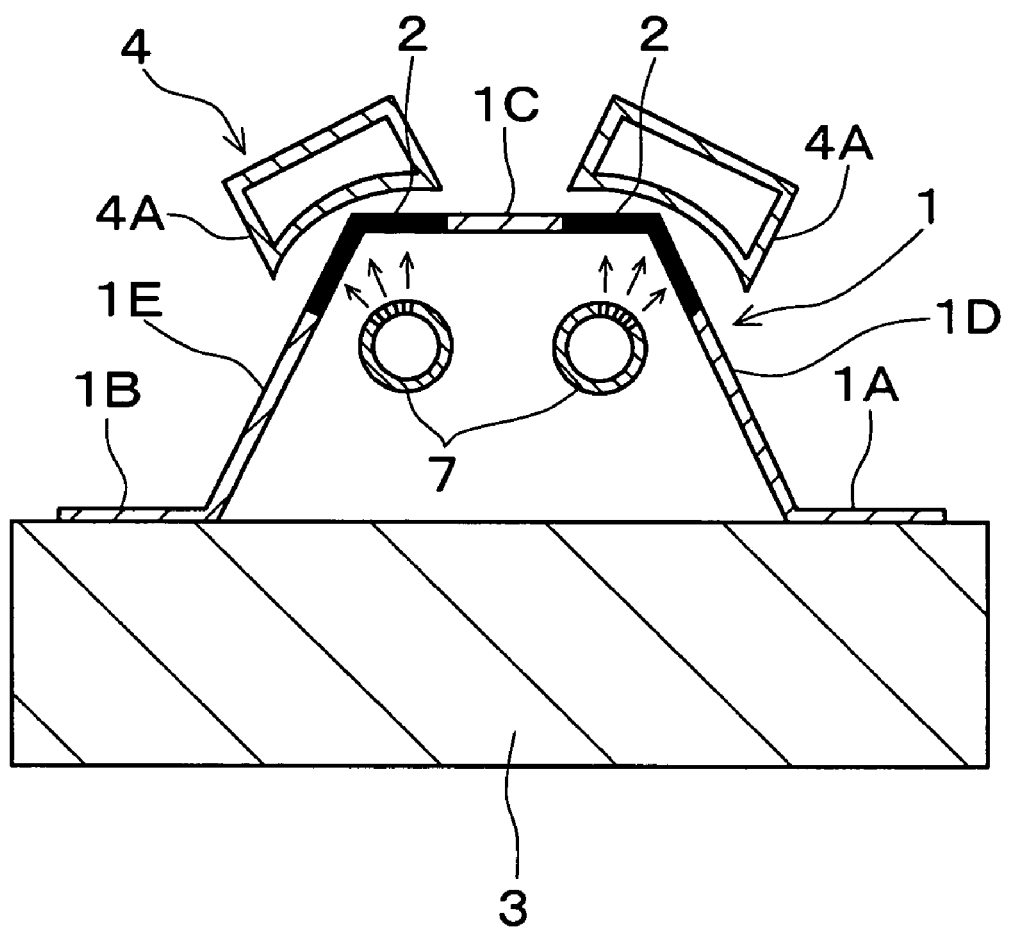

F I G. 9
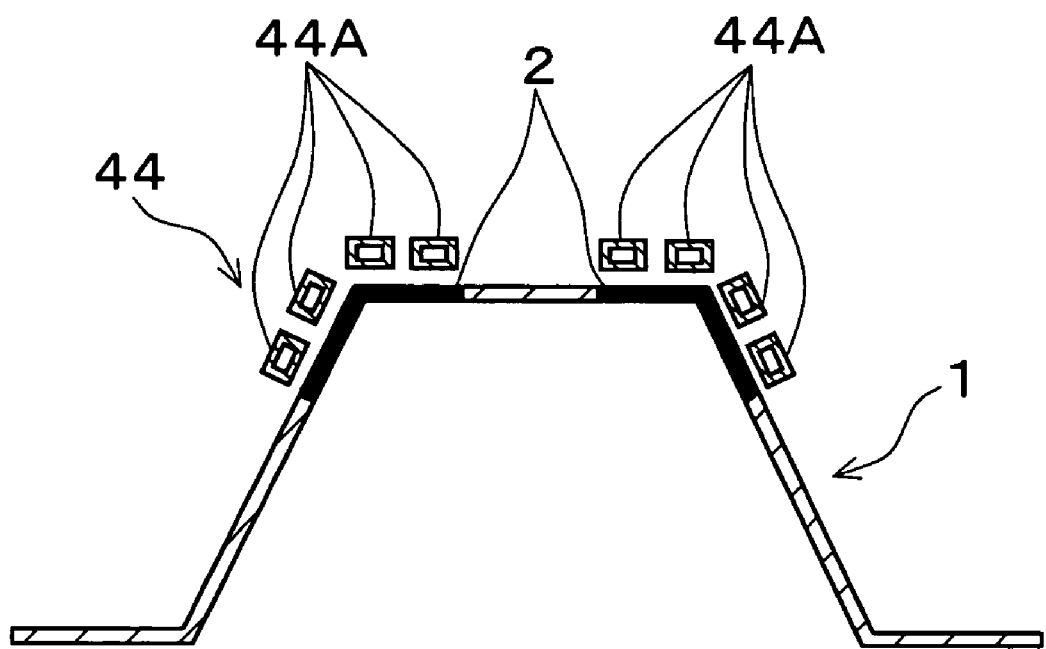

(1)

(2)

(3)

(4)

(5)

METHOD AND DEVICE FOR THIN PLATE ARTICLE INDUCTION HEATING, AND THIN PLATE ARTICLE

TECHNICAL FIELD

This invention relates to a method of heating inductively an article made of a thin sheet by a high-frequency current, and an apparatus therefor, applicable to an occasion, for example, when the article made of the thin sheet composing a vehicle body is heated for hardening.

BACKGROUND ART

A thin metal sheet is used as material for composing members for a vehicle body, other equipment or apparatus. In order to give the required strength to a demarcated and predetermined region in the article produced of the thin sheet, the whole of the predetermined region is heated to a temperature equal to or more than a target temperature for hardening. As apparatuses with which the heating is performed by an induction heating method using a high-frequency current, apparatuses in patent documents 1 and 2 mentioned below are known.

In an apparatus in patent document 1, an inductive portion of a heating inductor to which a high-frequency current is applied is movable in relationship to an article made of a thin sheet, and the inductive portion is moved in relation to the article made of the thin sheet to thereby heat a region of the article made of the thin sheet whereto the inductive portion is moved, by an inductive eddy-current. According to this apparatus, though a heating temperature can be adjusted in accordance with a setup of a moving speed, processes to move the inductive portion for every heating work of respective articles are required, and, therefore, it takes time to process only one piece of the article and a lot of articles can be hardly processed in a short time effectively.

In contrast with the above, an inductive portion of a heating inductor in the apparatus of patent document 2 corresponds to the whole of the region to be heated in an article made of a thin sheet. Therefore, according to the apparatus of patent document 2, a bulk heating can be realized, whereby the whole of the region to be heated can be heated simultaneously only by applying a high-frequency current to a heating inductor. The apparatus can treat respective articles in a short time, as compared with the apparatus in patent document 1 and, as a result, the working efficiency can be improved.

Patent document 1: Japanese Patent Application Laid-open No. Hei 10-17933 (paragraph number 0042, FIG. 4)

Patent document 2: Japanese Patent Application Laid-open No. 2000-256733 (paragraph number 0045, FIG. 1)

DISCLOSURE OF INVENTION

Problems to be Solved by the Invention

When an inductive portion of a heating inductor can heat inductively the whole of a region to be heated in an article simultaneously, an advantage that a bulk heating is available can be obtained. However, if an article is made of a thin sheet, different from the case where the article is made of a material having enough thickness, an eddy of an inductive eddy-current is not generated in the thickness direction, and only generated along the plane surface in the region to be heated of the thin sheet. Therefore, an adjustment in intensity of the inductive eddy-current in every portion of the plane surface of the regions to be heated, which is available when the eddy is generated in the thickness direction, is difficult to perform. If an unevenness of temperature increase occurs in the region to be heated, it is hard to deal with that.

A heat transfer path diverted in the thickness direction is hardly generated because of the thin sheet, thus the unevenness of the temperature increase is hardly alleviated as compared with a thick sheet.

On the basis of the above, when the article having the predetermined region receives a heating processing and is produced using a thin sheet as a material, the unevenness of the temperature increase tends to occur in the event. Hence it is difficult to heat only the predetermined region to a temperature equal to or more than a target temperature with a small unevenness of the temperature increase, in other words, with a small temperature difference, namely, it is difficult to set up a region to be heated as desired and, at the same time, to heat the region with a small temperature difference in the region.

As for a way for solving such problems it is conceivable to decrease the temperature of a portion which is heated excessively by means of intensive heat radiation or enforced heat cooling, however, other problems such as a need for complicated equipment or an increase in equipment costs arise. Besides, it is considered that the heat input to respective portions of the region to be heated is adjusted by controlling a heat inductor arranged in plural systems separately, however, the problem of the equipment cost increasing also arises by this means.

On the other hand, it is possible to adopt a way that the range, including the whole of the region to be heated, is heated, allowing an unevenness of temperature increase to occur by increasing a heat input amount, and, after that, a temperature difference is allowed to decrease during a lapse of time. Though the means has an advantage that specific equipment is not necessary, different from the above way, however, it results in losses of time and energy.

The present invention is made in consideration of the above. It is an object of the present invention to provide an induction heating method of an article made of a thin sheet, and an apparatus therefor, in which the reduction of an unevenness of temperature increase at the end of a heating work can be attained without specific equipment, securing a shortening of the working time, which is an advantage of a bulk heating.

Means for Solving the Problems

The present invention is made by the present inventors who obtained the following knowledge relating to the heating of an article made of a thin sheet using an induction heating method.

While the temperature of a region to be heated of an article made of a thin sheet is increased by induction heating, a period that a power application of a high-frequency current to a heating inductor is stopped, or a period that the application current is reduced is set up, to thereby stop or suppress the heat input to the region to be heated, the temperature difference occurring in the region to be heated decreases. After that, by reincreasing the temperature of the region to be heated by resuming the power application of the high-frequency current to the heating inductor, the whole of the region to be heated is heated to a temperature equal to or more than a target temperature. The temperature difference in the region to be heated at the end of the temperature increase is small, and an unevenness of temperature increase can be reduced as compared with a case that an intermediate step for reducing a temperature difference is not set up during the temperature increase.

In FIG. 10 to FIG. 13, the behaviors of the temperature increase thinkable theoretically concerning a heating work in which the intermediate step for reducing the temperature difference during the temperature increase is not set up, and a heating work in which the intermediate step is set up are explained. FIG. 10 is a graph of the case that the intermediate step is not set up, and FIG. 13 is a graph of the case that the intermediate step is set up. Besides, FIG. 11 shows an equivalent circuit assumed in the region to be heated when the region to be heated of the article made of the thin sheet has a temperature distribution. FIG. 12 (1) to FIG. 12(5) show variations of the equivalent circuits in accordance with the temperature increase. In the equivalent circuit in FIG. 11, an electric resistance R which generates a Joule heat based on an inductive eddy-current 'i' and an inductance L which does not generate the Joule heat at respective portions of the region to be heated are shown.

When the region to be heated begins to be heated by the induction heating and the temperatures of the respective portions A to D do not reach a magnetic transformation point $T_M$ shown in FIG. 10, relative permeabilities μ of the respective portions A to D are large, impedances ωL in the respective portions A to D are much larger than the electric resistances R when ω represents an angular frequency of the high-frequency current. Therefore, $i_R$ shown in FIG. 11 is approximately equal to the inductive eddy-current 'i', which is the status that the impedance ωL can be ignored. In FIG. 12 (1) showing the respective portions A to D which have the temperature differences, the electric resistance R of the highest-temperature portion A is largest, and the electric resistance R of the lowest-temperature portion D is smallest among the portions A to D, based on a characteristic that the electric resistance R becomes larger according to the temperature increase. Due to the differences of the electric resistance R involving the generation of the Joule heat, a common current approximately equal to the inductive eddy-current 'i' flows to the electric resistances R of the respective portions A to D, as a result, the temperature differences between the portions A and D are enlarged gradually. This phenomenon is shown by a' to d' as curves of temperature increase of the portions A to D in FIG. 10.

When the temperature increases at the respective portions A to D progress and the temperature at the portion A reaches the magnetic transformation point $T_M$, the relative permeability μ at the portion A is decreased suddenly. Thus, the impedance ωL at the portion A becomes smaller than the electric resistance R, $i_L$ becomes larger than $i_R$, namely, the impedance ωL cannot be ignored, as a result, the temperature increase at the portion A is depressed because the generation of the Joule heat decreases. FIG. 12 (2) shows the equivalent circuit of the status at that time.

After that, the temperatures at the portions B to D reach the magnetic transformation point $T_M$ at respective times of $t'_B$, $t'_C$, $t'_D$ in FIG. 10 in decreasing order of temperature. The equivalent circuits at that time are shown in FIG. 12 (3) to FIG. 12 (5). The generation of the Joule heat at the portions B to D at that time decreases, based on the sudden decreases of the relative permeabilities μ at the portions B to D, however, the variations of the generation of the Joule heat are not the variations concentrated on one part of the portion, therefore, the depression of the temperature increases at the portions B to D are alleviated gradually, compared with the depression of the temperature increase at the portion A.

After that, the temperatures of the portions A to D increase by the Joule heat based on the electric resistance R at the portions A to D. A rate of enlargement of the temperature differences becomes small as compared with the status before the temperatures reach the magnetic transformation point $T_M$, because concerns of the electric resistance R at the respective portions A to D become small due to the impedances ωL at the respective portions A to D, or the rate of the temperature increase of the electric resistance R lowers when the temperatures exceed the magnetic transformation point $T_M$.

When the temperatures at all portions A to D exceed a target temperature $T_Z$ shown in FIG. 10, and the induction heating is ended, a temperature difference ΔT' occurs at the portions A to D.

The case in which an intentional immediate step for reducing the temperature differences at the respective portions A to D is not set up is described above, FIG. 13 shows the case in which the step thereof is set up, and 'a' to 'd' in FIG. 13 are curves of the temperature increase at the portions A to D.

When the region to be heated is heated to a time $t_1$, the temperature differences at the respective portions A to D enlarge gradually as described above until the time $t_1$. If the induction heating is stopped from the time $t_1$ to a time $t_2$, the temperature differences of the respective portions A to D decrease during this suspension of the induction heating by a natural heat uniformization due to a heat transfer effect. After that, when the induction heating is resumed, the temperature differences of respective portions A to D enlarge gradually, however, the temperature differences at the time $t_2$ are smaller than the differences at the time $t_1$. Therefore, the temperature difference at portions A to D is ΔT when the temperature of the respective portions A to D exceed the magnetic transformation point $T_M$ at the time $t_A$ to $t_D$ and all portions A to D reach the temperature exceeding the target temperature $T_Z$ to finish the induction heating. The temperature difference ΔT is smaller than the temperature difference ΔT' in FIG. 10, therefore, the unevenness of the temperature increase at the end of the heating work in FIG. 13 is reduced as compared with the case in FIG. 10.

To put it differently, in the case of FIG. 10, since the temperature difference at the whole region of the region to be heated at the end of the induction heating is large, an average temperature of the region to be heated must be increased, for example, to make the temperature of the whole region equal to or more than the target temperature, required for the hardening, and as a result, a thermal history more than necessary is given to the high-temperature portion. Whereas in the case of FIG. 13, since the temperature difference at the whole of the region to be heated at the end of the induction heating is small, the temperature of the whole region can be equal to or more than the target temperature in a condition avoiding the unnecessary thermal history. Therefore, in the case of FIG. 13, the unnecessary temperature increase leading to an excessive temperature increase whereby an unfavorable influence is brought to the material to be processed can be avoided.

In the case of FIG. 13, it would be profitable to just set up an intermediate step which stops or reduces the power application of the high-frequency current to the heating inductor for a short time during the temperature increase, and the intermediate step is effective enough by taking the time on the second time scale, therefore, the advantage of the bulk heating whereby the heating work of the article is finished in a short time and the work efficiency is improved can be secured almost as a whole. Besides, since the heating work in FIG. 13 can be performed without special equipment such as a cooler or the like, there is no possibility of increasing the equipment costs.

Furthermore, since the highest temperature of the region to be heated in the case of FIG. 10 becomes higher than the case in FIG. 13, if a thin sheet as the material of the article having the region to be heated is, for example, a sheet material including a surface coating material such as galvanizing, there occurs a danger that the coating material vanishes by the heating, however, such a problem can be solved in the case in FIG. 13.

Additionally, in the case in FIG. 13, since the temperature difference at the end of the heating can be suppressed, and a leveling of the temperature at the whole of the region to be heated can be achieved, the occurrence of an unexpected change of material composition can be prevented, and the temperature difference before quenching in the hardening step can be suppressed in a favorable range. As a result, the occurrence of distortion caused by the quenching and residual stress after the hardening can be suppressed.

A method of induction heating and an apparatus therefor relating to the present invention is invented based on the principle of the heating work in FIG. 13 as described above.

An induction heating method of an article made of a thin sheet according to the present invention for heating a region to be heated inductively to a temperature equal to or more than a target temperature higher than a magnetic transformation point by applying a high-frequency current to a heating inductor having an inductive portion for heating inductively the whole of the region to be heated demarcated in the article made of the thin sheet simultaneously, includes a step of increasing the temperature for increasing the temperature of the region to be heated by induction heating using a heating inductor, a step of reducing the temperature difference to be set at least one time for reducing the temperature difference in the region to be heated by stopping or reducing the power application of the high-frequency current to the heating inductor after the step of increasing the temperature, and a step of reincreasing the temperature for reincreasing the temperature of the region to be heated by resuming the power application of the high-frequency current to the heating inductor after the step of reducing the temperature difference to thereby heat the whole region to be heated to a temperature equal to or more than the target temperature.

In the induction heating method, the step of reducing the temperature difference may be performed once, or several times. When it is set up several times, after a former step ends, the temperature of the whole of the region to be heated is increased, and a following step starts after the temperature is increased again.

Besides, the time when the step of reducing the temperature difference is set up may be before the temperature of the region to be heated reaches a magnetic transformation point, or may be after it reaches the magnetic transformation point, or may be just on the magnetic transformation point.

In the induction heating method of an article made of a thin sheet relating to the present invention, when the region to be heated is hardened, the following step to the step of reincreasing the temperature is to be a quenching step for quenching the whole of the region to be heated which is heated up to a temperature equal to a temperature equal to or more than the target temperature. Accordingly, the region to be heated can be hardened.

An induction heating apparatus of an article made of a thin sheet of the present invention includes a heating inductor having an inductive portion corresponding to the whole region of a region to be heated demarcated in the article made of the thin sheet, and a power supply device whereby a high-frequency current is applied to the heating inductor to increase the temperature of the region to be heated to a temperature equal to or more than a target temperature higher than the magnetic transformation point by the induction heating, in which the power supply device has a current controller for stopping or reducing temporarily the power application of the high-frequency current to the heating inductor before the temperature of the region to be heated reaches the target temperature.

In this apparatus, the power application of the high-frequency current to the heating inductor is stopped or reduced temporarily by the current controller before the region to be heated reaches the target temperature, and the power application of the high-frequency current to the heating inductor is resumed by a current controller, as a result, the induction heating method of the article made of the thin sheet can be realized The current controller in the apparatus for stopping or reducing temporarily the power application of the high-frequency current to the heating inductor may be automatic using computer programs or relay circuits, or may be manual, having a switch and the like operated manually.

An inductive portion of the heating inductor may extend straight in the longitudinal direction of the region to be heated. If the width of the region to be heated is large, the inductive portion can extend in the longitudinal direction, turning in zigzags across the width of the region to be heated.

When the current controller is automatic, the current controller can be optional.

As a first example, the current controller is a timer type controller having a timer for stopping or reducing temporarily the power application of the high-frequency current to the heating inductor when the time measured by the timer comes to a predetermined elapsed time from the start of the power application of the high-frequency current to the heating inductor.

As a second example, the current controller is an actual temperature measurement type controller which has a temperature measurer for measuring the temperature of the region to be heated, for stopping or reducing temporarily the power application of the high-frequency current to the heating inductor when the temperature of the region to be heated measured by the temperature measurer becomes a predetermined temperature.

As a third example, the current controller is an impedance-knowing type controller having a frequency tracker for tracking the frequency of the high-frequency current of the heating inductor corresponding to an impedance of the region to be heated, for stopping temporarily or reducing temporarily the power application of the high-frequency current to the heating inductor when a resonant frequency of the high-frequency current tracked by the frequency tracker becomes a predetermined frequency.

The current controller is composed of an inverter whereby the power supply device feeds the high-frequency current to the heating inductor, and a control device for controlling the inverter, applicable when the inverter and the control device are prepared as separate devices, and also applicable when the inverter and the control device are not separated, being integrated.

Furthermore, the structure of the heating inductor can be optional. As one example thereof, the heating inductor is constituted by plural numbers of good conductors of which inductive portions extend along the extending direction of the region to be heated being arranged side by side in the direction perpendicular to the extending direction of the region to be heated so as to cover the region to be heated, and these good conductors being connected in parallel.

According to the constitution, when a temperature-difference due to a difference of electrical resistance occurs in the region to be heated, the good conductors arranged corresponding to a portion having a high temperature, namely the portion where the electrical resistance is large, have a high impedance, as a result, the current flowing through the good conductors becomes small, and the good conductors arranged corresponding to a portion having a low temperature, namely the portion where the electrical resistance is small have a low impedance, as a result, the current flowing through the good conductors becomes large. Therefore, an inductive eddy-current decreases at the portion having a high temperature, and the inductive eddy-current increases at the portion having a low temperature. Accordingly, the temperature difference of the region to be heated is corrected to be leveled, and the unevenness of the temperature increase will be reduced further in conjunction with the effect by the step of reducing the temperature difference described above.

When the region to be heated is hardened in the present invention, an induction heating apparatus of an article made of a thin sheet of the present invention includes a quencher for quenching at least the region to be heated after said region to be heated reaches a temperature equal to or more than the target temperature.

The quencher can be the means in which coolant is sprayed onto the region to be heated from one side of the article made of the thin sheet, or in which the coolant is sprayed onto the region to be heated from both sides of the article made of the thin sheet.

In an article made of a thin sheet of the present invention in which the whole of a region to be heated is heated inductively to a temperature equal to or more than a target temperature higher than the magnetic transformation point, the heating of the region to be heated to a temperature equal to or more than the target temperature includes a step of increasing the temperature for increasing the temperature of the region to be heated by the induction heating, a step of reducing the temperature difference to be set at least one time for reducing the temperature difference at the region to be heated by stopping temporarily or reducing temporarily the induction heating after the step of increasing the temperature, and a step of reincreasing the temperature for reincreasing the temperature of the region to be heated by resuming the induction heating to thereby increase the temperature of the whole of the region to be heated to a temperature equal to or more than the target temperature after the step of reducing the temperature difference.

In the article made of the thin sheet, the region to be heated is quenched after it is heated to a temperature equal to or more than the target temperature in order to harden the region to be heated.

The present invention described above can be applicable to heat a demarcated region to be heated of an article made of a thin sheet. The region to be heated can be one part of the article, or the whole of the article.

In addition, a thin sheet indicates a sheet material having a thickness in which an inductive eddy-current is hardly generated, the thickness thereof is 3.2 mm or less, to say more narrowly, 2.3 mm or less. The thin sheet is a metal sheet which causes a magnetic transformation whereas a relative permeability decreases suddenly, such as various types of steel sheet of which the carbon content are different to each other (including a high-tensile steel), a ferritic stainless steel sheet, and a martensitic stainless steel sheet. The metal sheet can be one where a surface treatment such as galvanizing is applied.

Furthermore, the proper time or the length of time for beginning the temporary stop or the temporary reduction of the power application of the high-frequency current to the heating inductor for the step of reducing the temperature difference as described above can be determined in accordance with various factors such as the material or thickness of the thin sheet, and target temperature, voltage, current, and frequency of the high-frequency current. Besides, whether the power application of the high-frequency current is stopped or reduced temporarily can be determined in accordance with these factors.

The present invention can be applicable, in general, to the case when heating an article formed into a prescribed shape by pressing, or the like, a thin sheet, it is also applicable when an article kept in a flat shape as a thin sheet is heated. Further, after the article kept in the flat shape as the thin sheet is heated, the article can be press-formed and the like, or after the article kept in flat shape as the thin sheet is heated, the article is hardened by quenching, and then, can be press-formed and the like.

Furthermore, the article made of the thin sheet to which the present invention is applied may be used as a member of an optional machine, device, and apparatus, and examples thereof are a reinforcing member for a center pillar composing a vehicle body of a four wheeled vehicle, an impact beam of a door, and a floor frame and a front side frame of a vehicle body.

EFFECT OF THE INVENTION

According to the present invention, an effect that a reduction of the unevenness of a temperature increase at the end of a heating work can be achieved without any specific equipment, securing the shortening of the working time as an advantage of a bulk heating.

BRIEF DESCRIPTION OF DRAWINGS

FIG. 2 is a cross-sectional view taken along the line S2-S2 in FIG. 1;

FIG. 9 is a cross-sectional view taken along the line S9-S9 in FIG. 8;

EXPLANATION OF CODE

| | |
|---|---|
| 1 | article made of thin sheet |
| 2 | region to be heated |
| 4, 44 | heating inductor |
| 4A | inductive portion |
| 6, 16, 26, 36 | power supply device |
| 7 | cooling tube as quencher |
| 24 | timer |
| 25 | timer type controller |
| 27 | temperature sensor |
| 29 | actual temperature measurement type controller |
| 40 | frequency tracker |
| 41 | impedance-knowing type controller |
| 44A | good conductor |

BEST MODE FOR CARRYING OUT THE INVENTION

Hereinafter, some embodiments of the present invention will be described with reference to the drawings. An article 1 made of a thin sheet in the embodiments described as follows is disposed in a center pillar composing the body of a four-wheeled vehicle, which is a reinforcing member to give the center pillar enough strength against a side collision. The article 1 is produced by press forming a thin steel sheet.

Figure 1:
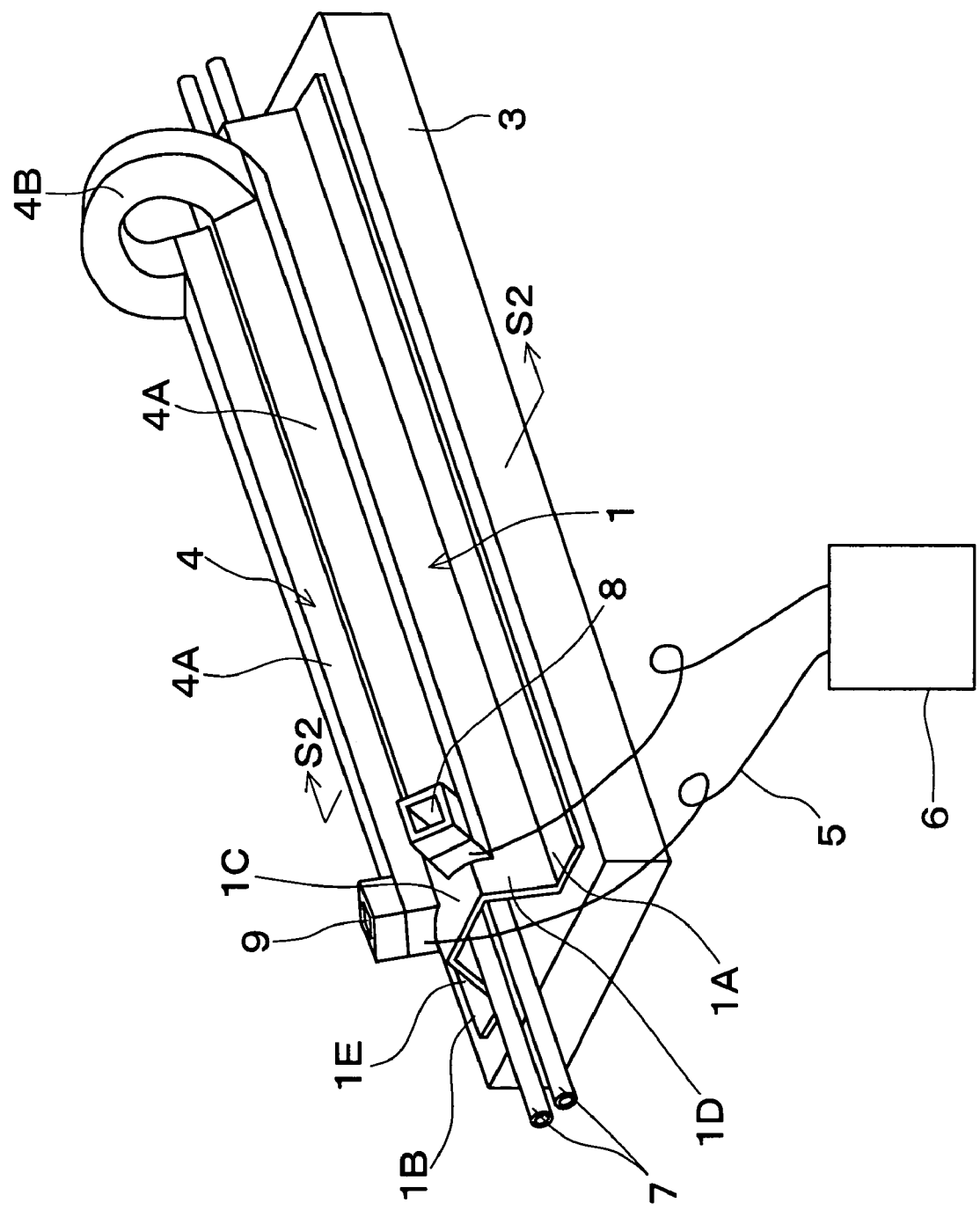
FIG. 1 is a schematic perspective view showing the status of work when a region to be heated of an article made of a thin sheet is heated inductively by an induction heating apparatus according to an embodiment of the present invention.

FIG. 1 is a schematic diagram showing an arrangement of an induction heating for the article 1 using a high-frequency current, and FIG. 2 is a cross-sectional view taken along the line S2-S2 in FIG. 1. The article 1 is composed of flange portions 1A and 1B which are both end portions in a right-and-left width direction, a protruding portion 1C which protrudes from between these flange portions 1A and 1B, right-and-left web portions 1D and 1E which link the protruding portion 1C to the flange portions 1A and 1B. These flange portions 1A and 1B, the protruding portion 1C, and the web portions 1D and 1E extend in a longitudinal direction continuously. Therefore, the article 1 is formed with a hat-shaped cross section continuing in the longitudinal direction.

As shown in FIG. 2, connecting sections between the protruding portion 1C and the web portions 1D and 1E are regions to be heated 2, which extend in the longitudinal direction of the article 1.

The article 1 to which a heating work is performed, as shown in FIG. 1, is set on a work table 3, and the flange portions 1A and 1B are clamped on the table 3 by a clamping device not shown. Two inductive portions 4A belonging to a heating inductor 4 of an induction heating apparatus are arranged to face the regions to be heated 2 with proper gaps therebetween respectively as shown in FIG. 2. The heating inductor 4 is connected to a power supply device 6 via feed cables 5 shown in FIG. 1. In a space between the article 1 and the work table 3, cooling tubes 7 are inserted therethrough, which spray coolant on the regions to be heated 2 from a reverse side thereof, after the whole of the regions to be heated 2 is heated to a temperature equal to or more than a target temperature thereof. These cooling tubes 7 quench at least the whole of the regions to be heated 2 heated up to a temperature equal to or more than the target temperature, serving as a quencher for hardening the whole of these regions to be heated 2.

The two inductive portions 4A connected by a connecting portion 4B shown in FIG. 1 have a hollow structure, as shown in FIG. 2. The coolant circulates in this hollow portion, which flows in from an entrance 8 and flows out from an exit 9 shown in FIG. 1. Thereby, heat generation at the inductive portions 4A when the regions to be heated 2 are heated inductively can be suppressed.

In addition, the inductive portions 4A have a size corresponding to the whole region of the regions to be heated 2. Therefore, an induction heating apparatus of the present invention is an apparatus for a bulk heating whereby the whole region of the regions to be heated 2 can be heated simultaneously.

When a switch of the power supply device 6 is turned on, the high-frequency current begins to be applied to the heating inductor 4 by the power supply device 6, thereby an inductive eddy-current is generated in the regions to be heated 2 by an electromagnetic induction effect of the inductive portions 4A, where a Joule heat is generated to increase the temperature of the regions to be heated 2.

In the present invention, after a step of increasing the temperature, the switch of the power supply device 6 is turned off to thereby stop temporarily a power application of the high-frequency current to the heating inductor 4. Namely, a step of reducing the temperature differences between respective portions of the regions to be heated 2 during the temperature increase is set up.

In order to finish the step of reducing the temperature differences, the application of the high-frequency current to the heating inductor 4 is started again by turning on the switch of the power supply device 6 again. Thereby a step of reincreasing the temperature starts by reheating inductively the regions to be heated 2. The step of reincreasing the temperature ends by turning off the switch of the power supply device 6 after the temperature of the whole region of the regions to be heated 2 reaches a temperature equal to or more than the target temperature, namely, after the temperature of the whole of the regions to be heated 2 reaches a temperature equal to or more than the temperature necessary to harden the whole region so as to have the hardness of a certain strength.

At the same time as the step of reincreasing the temperature ends, the coolant is sprayed from the cooling tubes 7 as the quencher on the regions to be heated 2 to thereby be quenched and hardened. After that, the article 1 is sent to the next processes of a painting process and the like by releasing the clamp of the clamp device.

Figure 3:
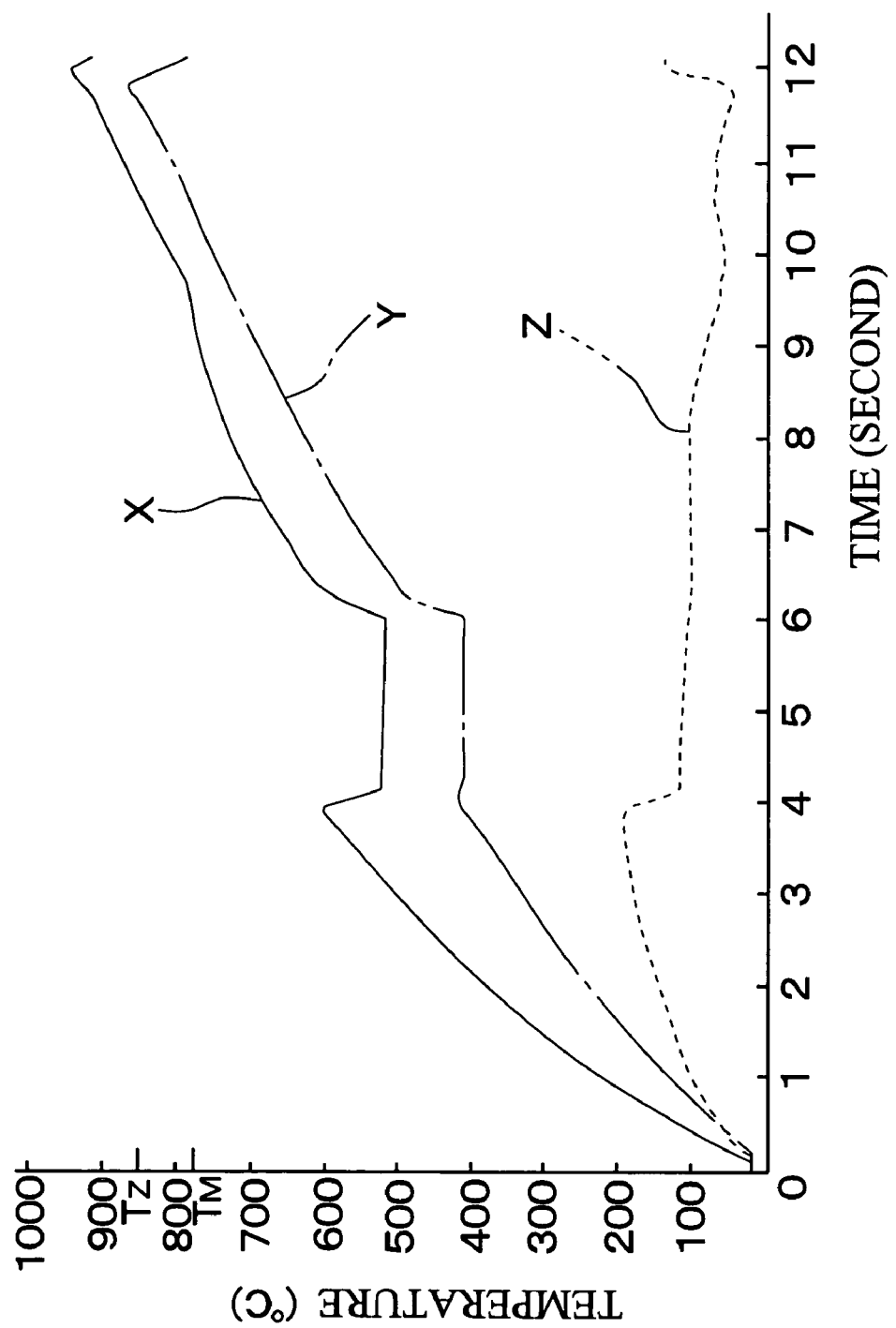
FIG. 3 is a graph showing an experimental result when a heating work is performed with a step of reducing a temperature difference set up during a temperature increase.
Figure 4:
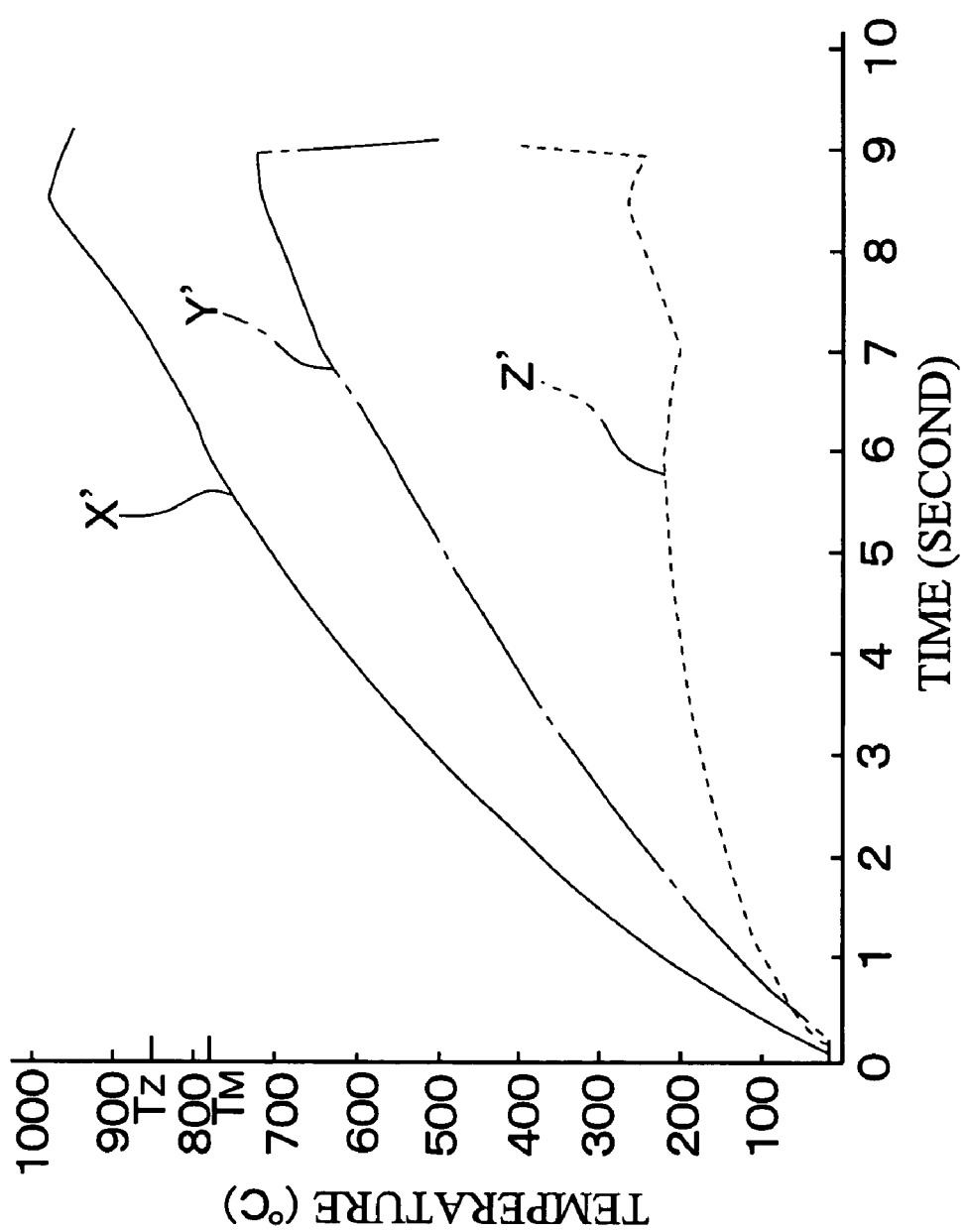
FIG. 4 is a graph showing an experimental result when the heating work is performed without the step of reducing a temperature difference during the temperature increase.

FIG. 3 and FIG. 4 are graphs showing curves of the temperature increase of the regions to be heated 2, which are obtained from an experimental result. FIG. 3 indicates a case that the above-mentioned step of reducing the temperature differences is set up once during the temperature increase, and FIG. 4 indicates a case that the step of reducing the temperature differences is not set up.

An article used in the experiment is formed by pressing a steel sheet of 0.16% in carbon content and 1.4 mm in thickness into a hat shaped cross section as described in FIG. 1, which is disposed inside a center pillar of a four-wheeled vehicle as a reinforcing member. Further, the article is 180 mm in width, 70 mm in height and 600 mm in length. As for the high-frequency current applied to the heating inductor, the electric power thereof is 50 kW~80 kW, the voltage thereof is about 240V, the electric current thereof is 230 A~340 A and the frequency thereof is 23 kHz~24.5 kHz. Temperature measurements of the regions to be heated 2 are performed at 30 spots in total.

In FIG. 3, X denotes a curve of temperature increase at a portion where the temperature is highest, Y denotes a curve of temperature increase at a portion where the temperature is lowest, and Z denotes a curve showing the change of the difference between the highest temperature and the lowest temperature. In FIG. 4, X' denotes a curve of the temperature increase at a portion where the temperature is highest, Y' denotes a curve of increasing temperature at a portion where the temperature is lowest, and Z' denotes a curve showing the change of the difference between the highest temperature and the lowest temperature.

First, a case of the experiment in FIG. 4 will be described. In this experiment, a high-frequency current is applied continuously to the heating inductor 4 for 8.5 seconds from the start of heating by turning on the switch of the power supply device 6, after that, the switch is turned off. The temperature of the highest-temperature portion when the switch is turned off exceeds a target temperature $T_z$ necessary to harden the regions to be heated 2 to have the hardness of a certain strength, however, the temperature of the lowest-temperature portion does not reach the target temperature $T_z$, and additionally, the temperature difference between both portions is so large, of about 270° C.

In a case of the experiment in FIG. 3, a step of reducing the temperature differences is set up by turning off the switch of the power supply device 6 after 3.9 seconds from the start of heating by turning on the switch of the power supply device 6. Further, a step of reincreasing the temperature is set up by turning on the switch again after 6.0 seconds from the start of heating. The step of reincreasing the temperature continues until the switch is turned off after 11.8 seconds from the start of heating. When the step of reincreasing the temperature ends, respective temperatures of the highest-temperature portion and the lowest-temperature portion reach the target temperature $T_z$, and additionally, a temperature difference between both portions is so small, of about 50° C.

In the experiment of FIG. 3, the temperature difference is about 200° C. when the step of reducing the temperature differences starts, however, the temperature difference is about 100° C. when the step ends. Therefore, the temperature difference was improved by about 100° C. during the step. Further, after the temperatures of the regions to be heated 2 reached a magnetic transformation point $T_M$, the temperature difference was still improved. Such an improvement of the temperature difference is performed until the heating work ends, and the final temperature difference when the heating work ends is a small value, of about 50° C.

According to this embodiment as described above, the step of reducing the temperature differences of the regions to be heated 2 is set up by stopping temporarily the application of high-frequency current to the heating inductor 4 during the temperature increase, and, as a result, the temperature differences of the regions to be heated 2 can be made small at the end of the heating work for increasing the temperature of the whole of the regions to be heated 2 to a temperature equal to or more than the target temperature, in other words, an unevenness of temperature increase of the regions to be heated 2 at the end of the heating work can be reduced.

In addition, the effect of reducing the unevenness of the temperature increase can be realized without providing a specific means such as cooling a part of the regions to be heated 2 to the induction heating apparatus, therefore the effect is operative in aspects of a set-up cost or energy efficiency. Since the effect can be realized by providing a short time of several seconds during which the high-frequency current is not applied to the heating inductor 4, in the middle of temperature increase, a reduction of working hours as an advantage of the bulk heating which heats the whole region of the regions to be heated 2 by the inductive portions 4A of the heating inductor 4 can be secured almost as a whole.

Since the temperature differences of the regions to be heated 2 are small when the whole region of the regions to be heated 2 reaches the target temperature, the highest temperature does not become the temperature exceeding widely the target temperature. Therefore, if a thin sheet as the material of the article 1 is, for example, a sheet material including a surface coating material such as galvanizing, the surface coating material is in no danger of vanishing by the heating.

Furthermore, since a leveling of the temperatures of the whole regions to be heated 2 at the end of heating can be achieved, the occurrence of an unexpected change of material composition caused by increase in temperature in some parts, occurrence of distortion caused by quenching for the hardening, and occurrence of residual stress after the hardening can be suppressed.

Figure 5:
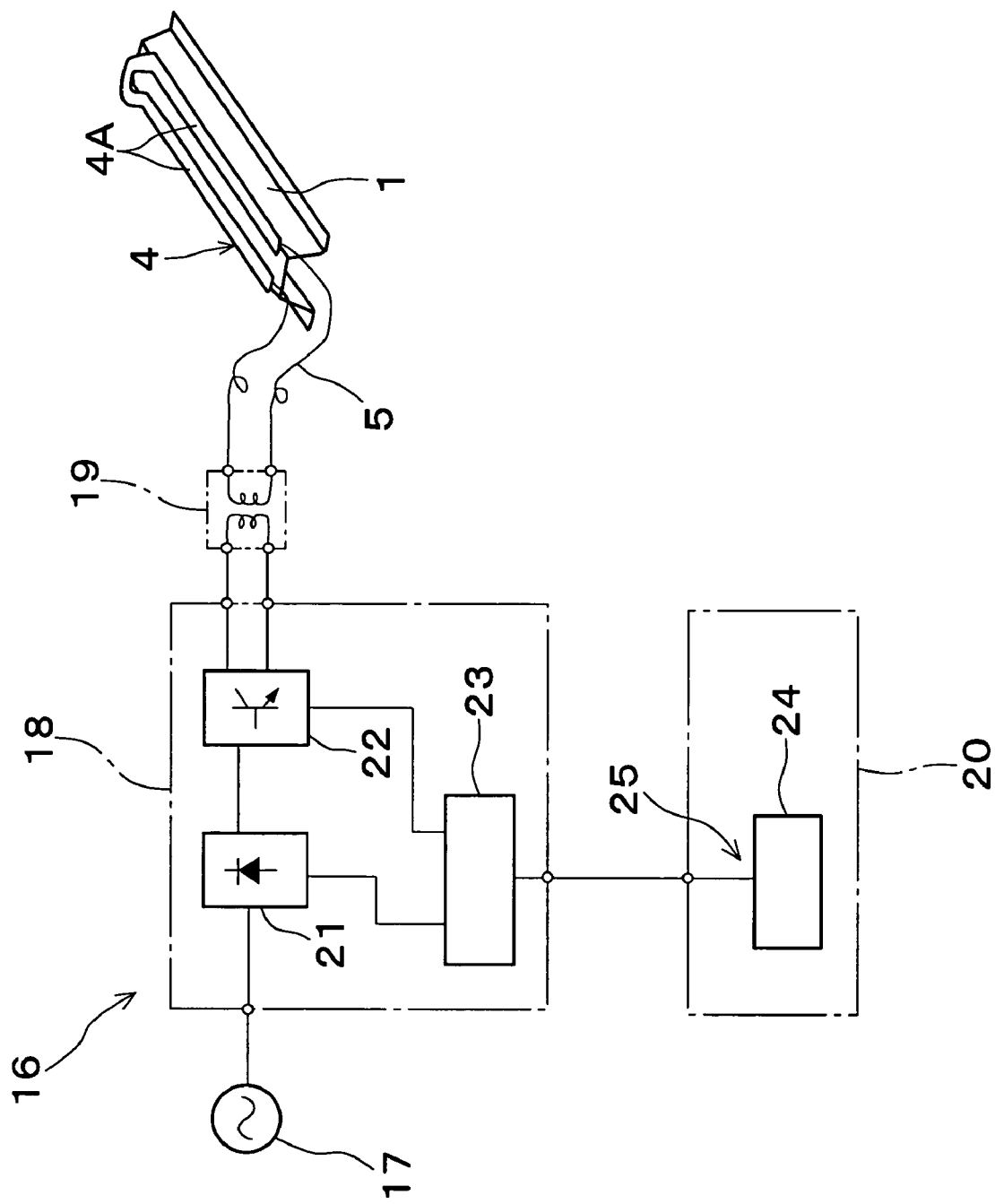
FIG. 5 is a view showing an embodiment of a power supply device of which the current controller is a timer type controller.
Figure 6:
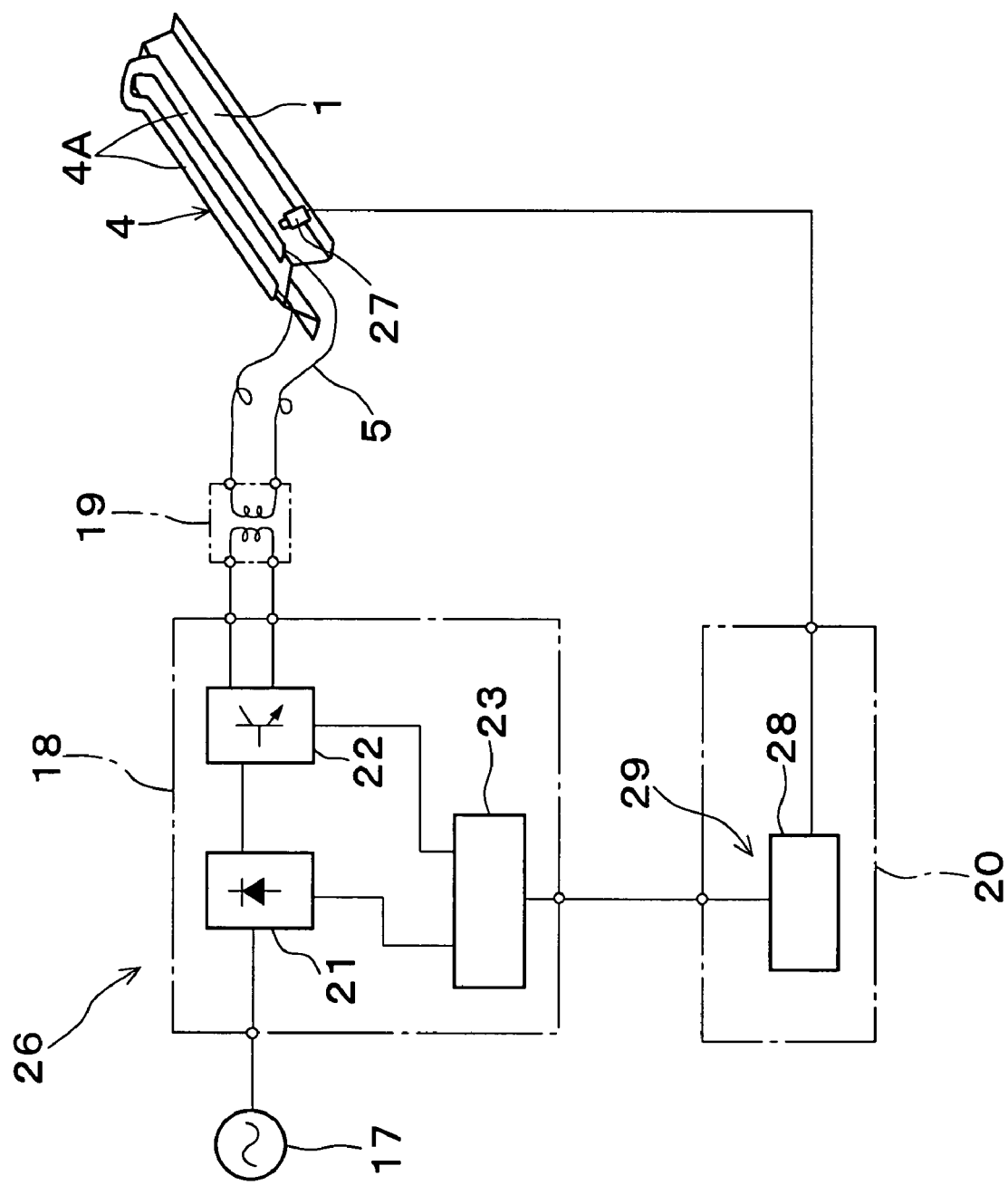
FIG. 6 is a view showing an embodiment of a power supply device of which the current controller is an actual temperature measurement type controller.
Figure 7:
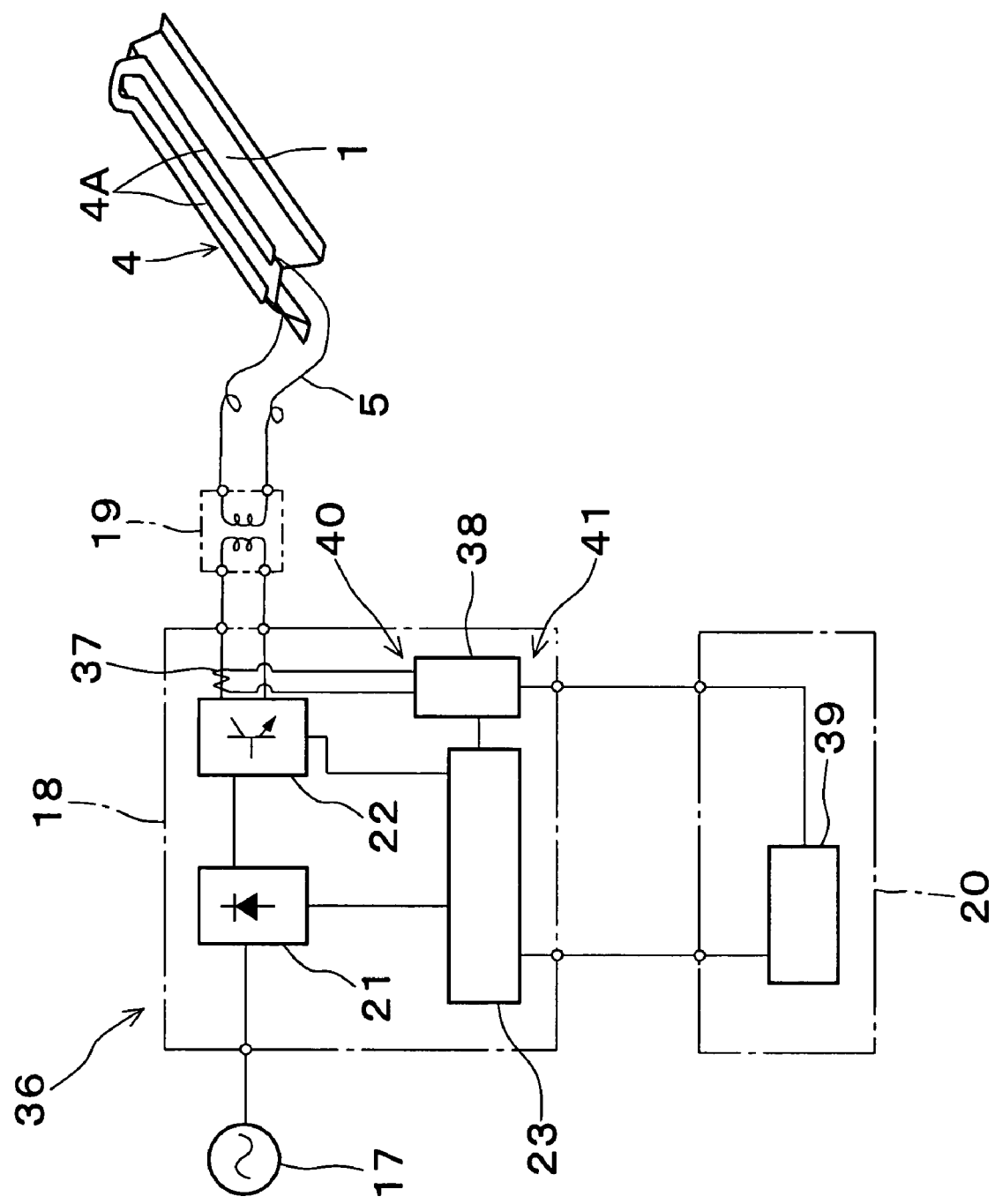
FIG. 7 is a view showing an embodiment of a power supply device of which the current controller is an impedance-knowing type controller.

Regarding the power supply device 6 of the embodiment in FIG. 1 as described above, the power application of high-frequency current to the heating inductor 4 is stopped temporarily by manual operating of the switch thereof. Therefore, the switch thereof is a current controller for stopping temporarily the power application of the high-frequency current to the heating inductor 4. FIG. 5 to FIG. 7 show a power supply device relating to another embodiment of which the current controller is different from the one in FIG. 1.

FIG. 5 shows an embodiment in which the current controller is a timer type controller 25. A power supply device 16 in FIG. 5 is composed of a power supply 17, an inverter 18, a matching transformer 19 and a control device 20. The inverter 18 is provided with a forward converter 21 for converting an alternating current such as a three-phase current from the power supply 17 into a direct current or a ripple current, an inverse converter 22 for converting the current from the forward converter 21 into a high-frequency current, and an inverter controller 23. The high-frequency current converted in the inverse converter 22 is sent to the matching transformer 19, to which the heating inductor 4 is connected via the feed cables 5.

The control device 20 for controlling the inverter 18 is provided with a timer 24, which measures the time of the heating work started at the regions to be heated 2 of the article 1 by a power application of the high-frequency current to the heating inductor 4. When the time from a start of the heating work of the article 1 comes to the predetermined time stored in the timer 24, based on an order from the timer 24, the control device 20 sends a control signal to the inverter 18 for instructing the stop of the power to the matching transformer 19 from the inverse converter 22 to thereby start the step of reducing the temperature differences as described above, for stopping temporarily the power application of the high-frequency current to the heating inductor 4. Further, when the time from the start of the heating work of the article 1 comes to the predetermined time stored in the timer 24, based on the order from the timer 24, the control device 20 sends a control signal to the inverter 18, for instructing a restarting of the power feeding to the matching transformer 19 from the inverse converter 22 to thereby finish the step of reducing the temperature differences.

According to the embodiment in which the current controller of the power supply device 16 is the timer type controller 25 composing of the timer 24 and the like, the start and the end of the step of reducing the temperature differences can be automated by the timer 24.

FIG. 6 shows an embodiment in which the current controller is an actual temperature measurement type controller 29. A power supply device 26 in FIG. 6 is provided with a sensor 27 for measuring the temperatures of predetermined portions in the regions to be heated 2 of the article 1. The control device 20 is provided with a temperature comparator 28 for checking measurement data from the sensor 27. The temperature comparator 28 stores in advance the temperature at which the heating of the regions to be heated 2 should be stopped temporarily after the start of the heating work of the article 1 and the temperature at which the heating of the regions to be heated 2 should be restarted.

After the heating work is started, the temperature of the regions to be heated 2 measured by the sensor 27 becomes the temperature at which the heating of the regions to be heated 2 should be stopped temporarily, based on an order from the comparator 28, the control device 20 sends a control signal to the inverter 18, for instructing the stop of the power to the matching transformer 19 from the inverse converter 22 to thereby start the step of reducing the temperature differences for stopping temporarily the power application of the high-frequency current to the heating inductor 4. In addition, when the temperature measured by the sensor 27 lowers to the temperature at which the heating of the regions to be heated 2 should be restarted, based on an order from the temperature comparator 28, the control device 20 sends the control signal to the inverter 18, for instructing the restarting of the power supply to the matching transformer 19 from the inverse converter 22 to thereby end the step of reducing the temperature differences.

According to the embodiment in which the current controller of the power supply device 26 is the actual temperature measurement type controller 29 composed of the sensor 27 and the temperature comparator 28 and the like, the start and the end of the step of reducing the temperature differences can be performed accurately, based on the actual temperature of the regions to be heated 2.

The step of reducing the temperature differences as described above is the step of stopping temporarily the power application of the high-frequency current to the heating inductor 4, however, the temperature differences of the regions to be heated 2 can be decreased by reducing the power application of the high-frequency current to the heating inductor 4. Therefore, the step of reducing the temperature differences can be a step of reducing temporarily the power application of the high-frequency current to the heating inductor 4. About a 10% reduction in an electric current level can make the temperature increase of the regions to be heated 2 substantially zero.

FIG. 7 shows an embodiment in which the current controller is an impedance-knowing type controller 41 having a frequency tracker 40 for tracking the frequency of the high-frequency current of the heating inductor 4 corresponding to the impedance of the regions to be heated 2. The step of reducing the temperature differences in this embodiment is the step of reducing temporarily the power application of the high-frequency current to the heating inductor 4.

The inverter 18 of a power supply device 36 in FIG. 7 is provided with a current detector 37 for detecting the behavior of the high-frequency current fed to the heating inductor 4 via the matching transformer 19 from the inverse converter 22. Data of the frequency of the high-frequency current of the heating inductor 4 or data of a phase difference between the current and voltage obtained by the current detector 37 are sent to a resonant frequency detector 38. The current detector 37 and the resonant frequency detector 38 compose a frequency tracker 40 in conjunction with the inverter controller 23 of the inverter 18. The frequency tracker 40 performs a frequency tracking operation for matching the current frequency fed from the inverse converter 22 to the matching transformer 19 to a resonant frequency of the high-frequency current of the heating inductor 4 from moment to moment by the circuit operation for making the phase difference zero, between the high-frequency current of the heating inductor 4 and the voltage detected by the current detector 37.

The resonant frequency detector 38 detects the resonant frequency of the high-frequency current of the heating inductor 4 obtained by the frequency tracking operation, under a standard that the phase difference becomes zero, and the detected resonant frequency is sent to a frequency comparator 39 of the control device 20. The frequency comparator 39 stores two predetermined frequencies. A first frequency is the frequency for the occasion when the power application of the high-frequency current to the heating inductor 4 should be reduced temporarily, and a second frequency is the frequency for the occasion when the application of the current to the heating inductor 4 should be restarted at the original current level of the high-frequency current, in short, the frequency for the occasion when the application status is brought back to the original application status before the temporary reduction is performed. The resonant frequency of the high-frequency current of the heating inductor 4 sent to the frequency comparator 39 from the resonant frequency detector 38 is compared with the first and second frequencies.

The resonant frequency of the high-frequency current of the heating inductor 4 corresponds to the impedance of the regions to be heated 2, and the impedance corresponds to the temperature of the regions to be heated 2.

When the resonant frequency of the high-frequency current of the heating inductor 4 is sent to the frequency comparator 39 from the resonant frequency detector 38, the frequency comparator 39 knows indirectly the impedance of the regions to be heated 2 via the resonant frequency. Thus, the frequency tracker 40 and the frequency comparator 39 and the like compose the impedance-knowing type controller 41.

After the start of the heating work of the article 1, when a resonant frequency of the high-frequency current of the heating inductor 4 which is sent to the frequency comparator 39 from the resonant frequency detector 38 coincides with the first frequency stored in the frequency comparator 39, the control device 20 sends the control signal to the inverter 18, for instructing the reduction of the power feeding from the inverse converter 22 to the matching transformer 19, based on the order from the frequency comparator 39, to thereby start the step of reducing the temperature differences for reducing temporarily the power application of the high-frequency current to the heating inductor 4. After that, when the resonant frequency of the high-frequency current of the heating inductor 4 which is sent to the frequency comparator 39 from the resonant frequency detector 38 coincides with the second frequency stored in the frequency comparator 39, the control device 20 sends the control signal to the inverter 18, for instructing the restart of the power feeding from the inverse converter 22 to the matching transformer 19 at the original current level, to thereby finish the step of reducing the temperature differences.

According to the embodiment shown in FIG. 7, changes in the impedance at the regions to be heated 2 correspond to changes in the temperature of the whole region of the regions to be heated 2, therefore the step of reducing the temperature differences can be set up accurately in accordance with the temperature changes of the regions to he heated 2, as compared with the embodiment in FIG. 6 in which one sensor 27 measures one portion at the regions to be heated 2.

The step of reducing the temperature differences of the embodiment in FIG. 7 as described above is set up in a form that the power application of the high-frequency current to the heating inductor 4 is reduced temporarily, however, the step of reducing the temperature differences of the embodiment in FIG. 7 can be set up in a form that the power application of the high-frequency current to the heating inductor 4 is stopped temporarily, under a condition that a timer for restarting the power application is set up additionally, or under a condition that a resonant frequency detector for detecting a resonant frequency when the temperature of the regions to be heated 2 lowered to the temperature at which the power application should be restarted is set up additionally.

Figure 8:
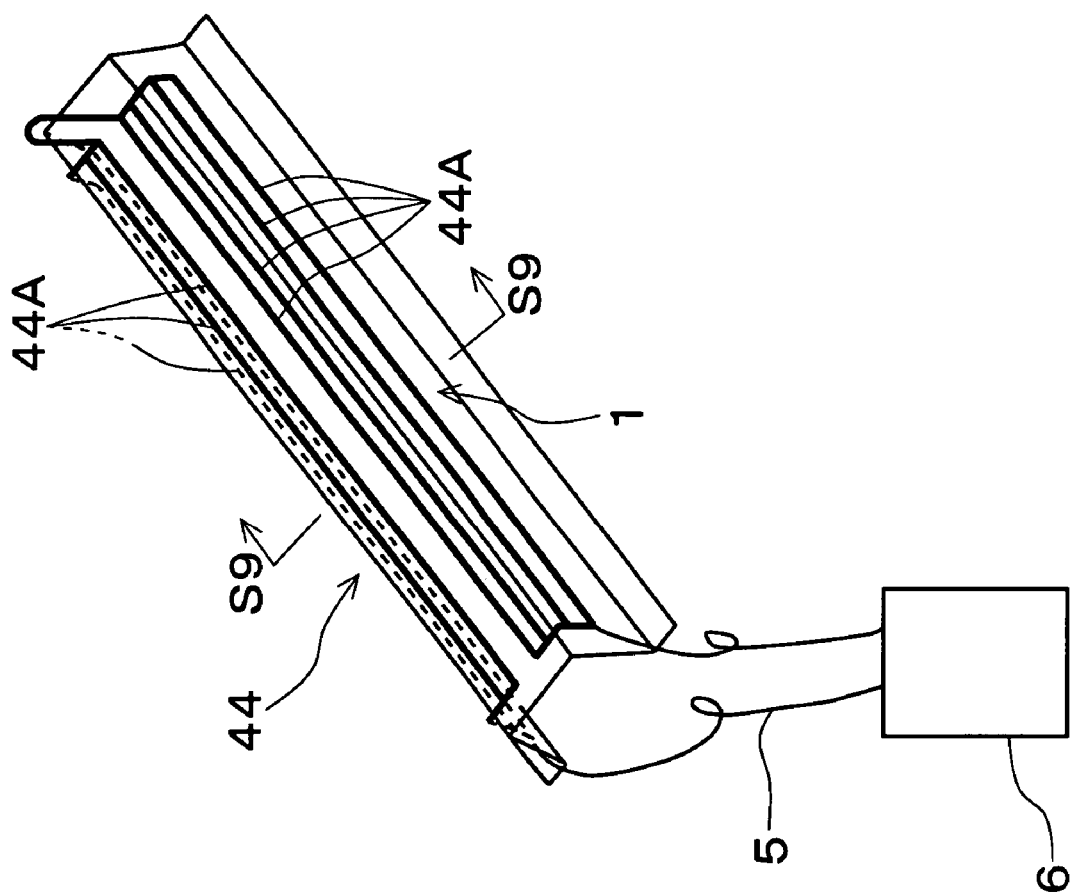
FIG. 8 is a same view as FIG. 1 showing another embodiment of an inductive portion of a heating inductor.
Figure 10:
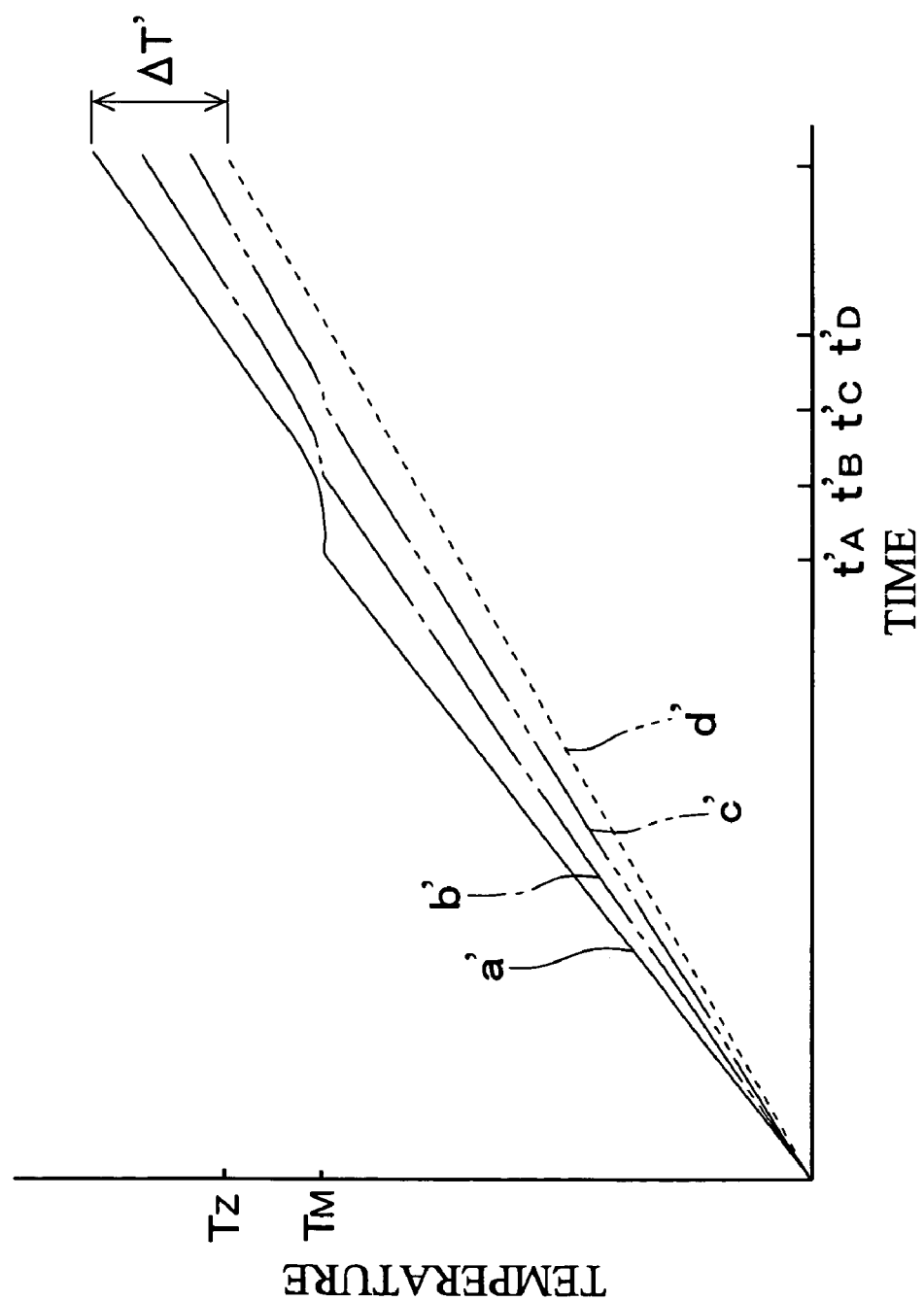
FIG. 10 is a graph showing curves of temperature increases at respective portions of the region to be heated thinkable theoretically when the region to be heated is heated inductively without the step of reducing the temperature difference.
Figure 11:
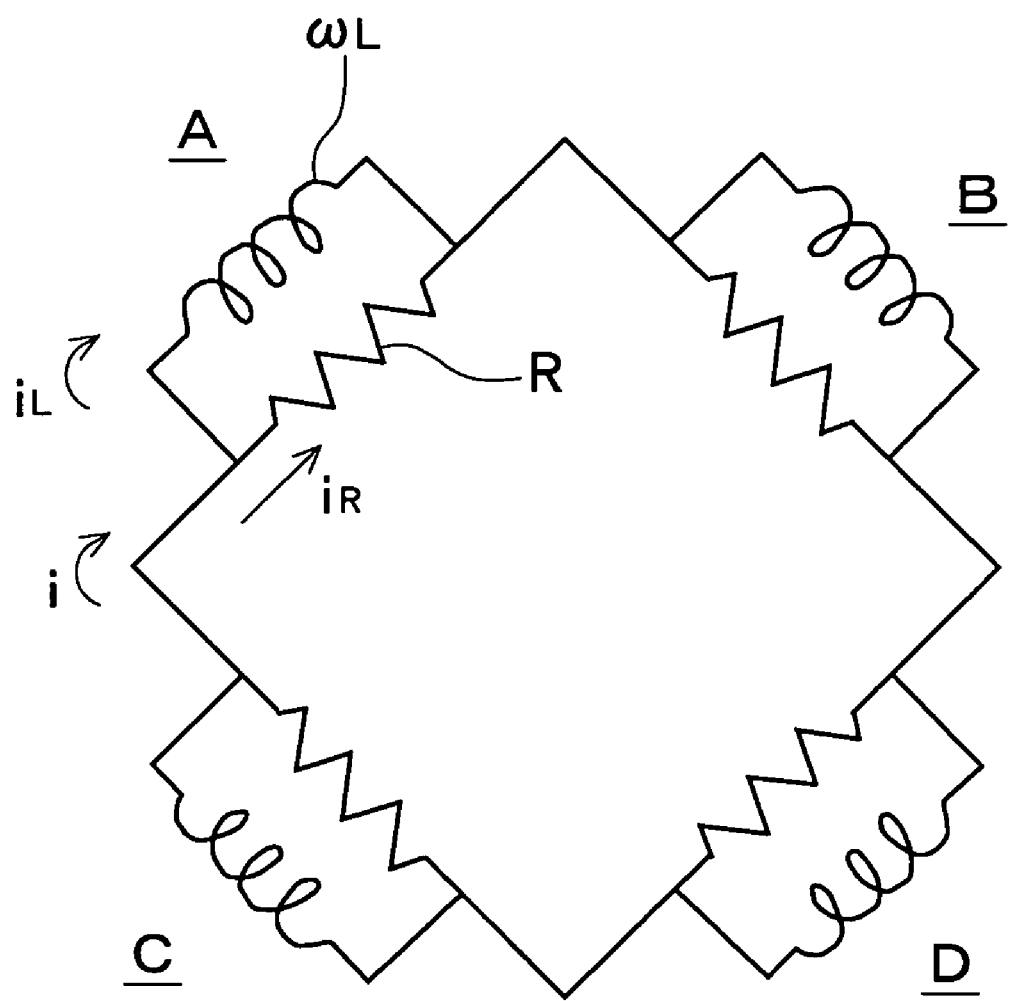
FIG. 11 is a view showing an equivalent circuit of respective portions in the region to be heated where a temperature distribution occurs.
Figure 12:
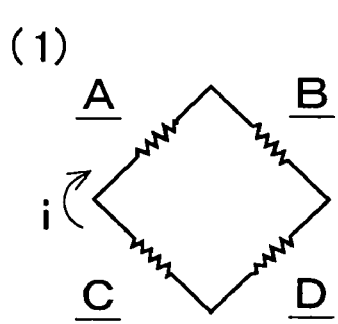
FIG. 12 is a view showing variations of the equivalent circuits varying in order of (1) to (5) when the temperatures of respective portions in the region to be heated reach the magnetic transformation point.
Figure 12:
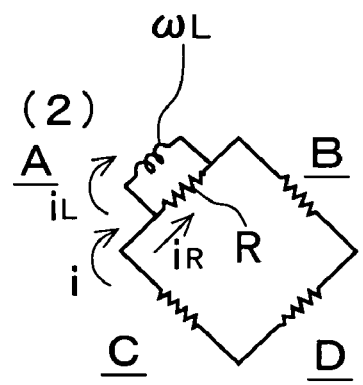
Figure 12:
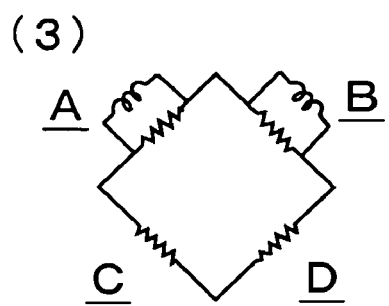
Figure 12:
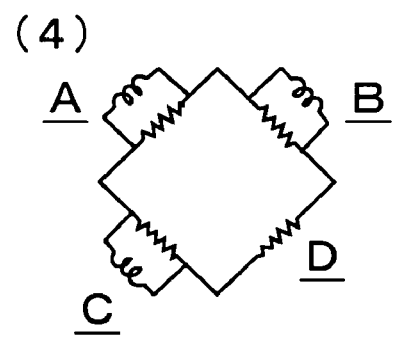
Figure 12:
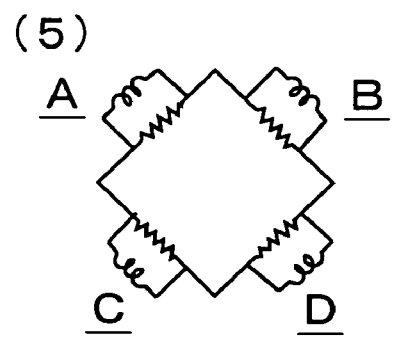
Figure 13:
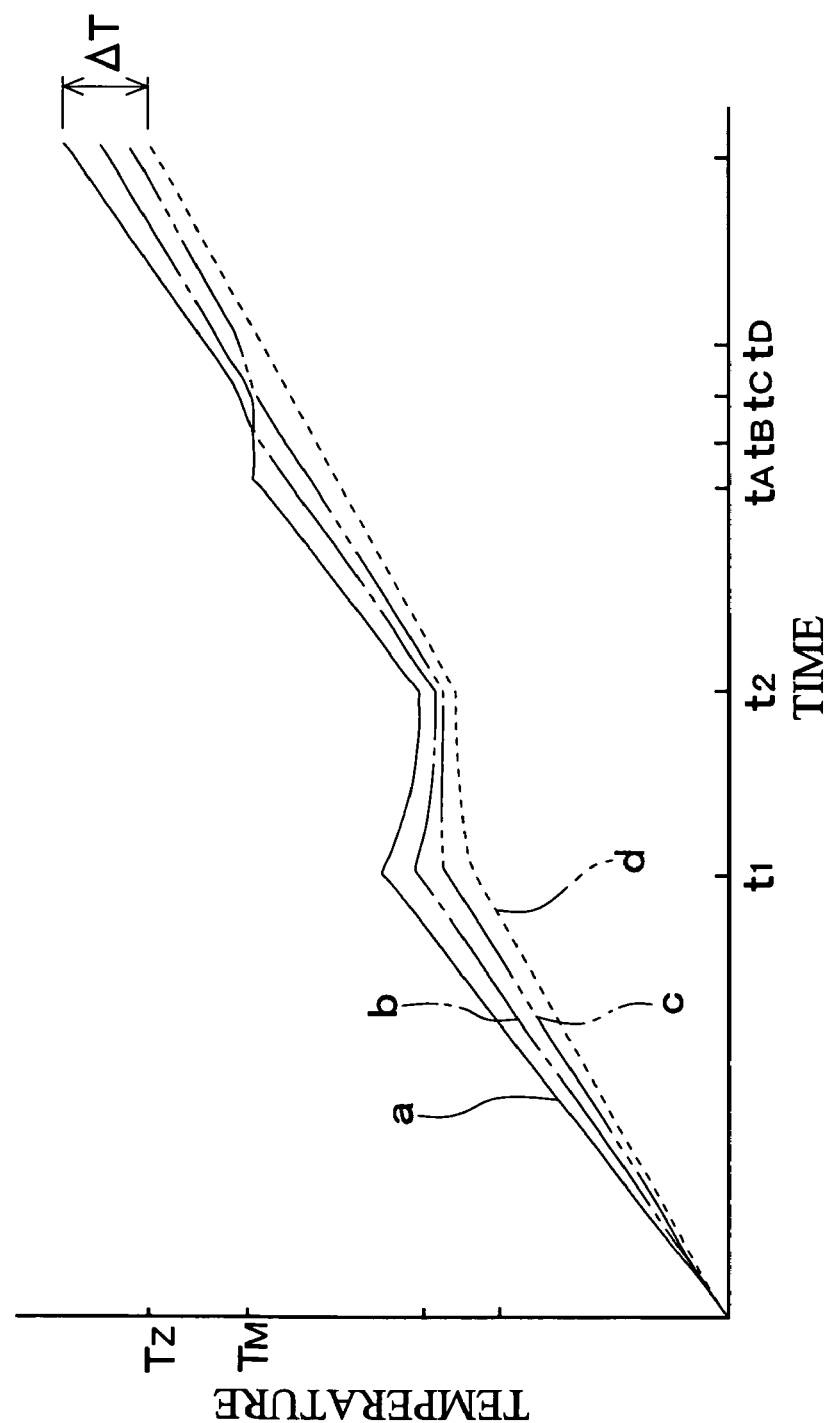
FIG. 13 is a graph showing curves of temperature increase at respective portions of the region to be heated thinkable theoretically when the region to be heated is heated inductively with the step of reducing the temperature difference set up.

FIG. 8 shows another embodiment concerning an inductive portion of a heating inductor, and FIG. 9 is a cross-sectional view taken along the line S9-S9 in FIG. 8. A heating inductor 44 to which the high-frequency current is applied by the power supply device 6 is provided with a plurality of, four good conductors 44A in the embodiment shown in the drawing, facing respectively to the two places of the regions to be heated 2 of the article 1. These good conductors 44A form inductive portions generating the inductive eddy-current in the regions to be heated 2. The respective good conductors 44A of which inductive portions extend in an extending direction of the regions to be heated 2 are arranged side by side in a width direction of the article 1, perpendicular to the extending direction of the regions to be heated 2 to thereby cover the respective regions to be heated 2 by the good conductors 44A. The four good conductors 44A provided to the respective two regions to be heated 2 are connected in parallel with each other.

According to this embodiment, if an unevenness of a temperature increase occurs in the regions to be heated 2 which has a certain dimension in the width direction of the article 1, a current applied to the good conductor 44A arranged in response to a high-temperature portion of which the electrical resistance is rather large becomes rather small, a current applied to the good conductor 44A arranged in response to a low-temperature portion of which the electric resistance is rather small becomes rather large. As a result, the heat input to the high-temperature portion is suppressed and the heat input to the low-temperature portion is intensified. Accordingly, the temperature differences of the regions to be heated 2 are corrected to be leveled, and the unevenness of the temperature increase at the end of the heating work will be reduced further in conjunction with the effect by the step of reducing the temperature differences described above.

Note that a power supply device of the embodiment in FIG. 8 and FIG. 9 can be the power supply devices 16, 26, 36 shown in FIG. 5 to FIG. 7, and the power supply device 6 in FIG. 1 in which the switching operation is performed manually can be also adopted.

INDUSTRIAL AVAILABILITY

The present invention can be utilized for heating inductively an article made of a thin sheet by a high-frequency current for performing a hardening and the like to the article made of the thin sheet composing a vehicle body.

The invention claimed is:

1. An induction heating apparatus for heating a region of a thin sheet by inductive heating to a temperature at least equal to a target temperature which is higher than a magnetic transformation point of the thin sheet, said apparatus comprising:
   a heating inductor comprising an inductive portion for heating inductively the entire region of the thin sheet simultaneously;
   a power supply device for applying a high-frequency current to the heating inductor; and
   a current controller for reducing the application of the high-frequency current to the heating inductor to allow the temperatures throughout the entire region of the thin sheet to become more equalized and then for increasing the application of the high-frequency current to the heating inductor to increase the temperature of the entire region of the thin sheet to the temperature at least equal to the target temperature, said current controller having a frequency tracker for tracking the high-frequency current of the heating inductor corresponding to an impedance of the region to be heated, and stopping or reducing temporarily the power application of the high-frequency current to said heating inductor when a resonant frequency of the high-frequency current becomes a predetermined frequency.

2. The induction heating apparatus according to claim 1, wherein said current controller has a timer for stopping or reducing temporarily the power application of the high-frequency current to said heating inductor when a time measured by the timer reaches a predetermined elapsed time from the start of the power application of the high-frequency current to said heating inductor.

3. The induction heating apparatus according to claim 1, wherein said current controller has a temperature measurer for measuring the temperature of the region to be heated and stops or reduces temporarily the power application of the high-frequency current to said heating inductor when the temperature of the region to be heated becomes a predetermined temperature.

4. The induction heating apparatus according to claim 1, wherein said heating inductor comprises a plurality of good conductors having an inductive portion which extends along an extending direction of the region to be heated and is arranged side by side in a direction perpendicular to the extending direction so that the region to be heated is covered, and the plural good conductors are connected in parallel.

5. The induction heating apparatus according to claim 1, further comprising a quencher for quenching at least the region to be heated after the region reaches the temperature of at least equal to the target temperature.

6. The induction heating apparatus of claim 1, wherein the current controllers stops the application of high frequency current to the heating inductor to allow the temperatures throughout the entire region of the thin sheet to become more equalized.

* * * * *